US012656996B2

(12) United States Patent
Wang

(10) Patent No.: US 12,656,996 B2
(45) Date of Patent: Jun. 16, 2026

(54) REMOTE CONTROL METHOD, APPARATUS, DEVICE, AND MEDIUM USING SIMULTANEOUS FIRST AND SECOND SCREEN CAPTURES

(71) Applicant: SHENZHEN HITEVISION TECHNOLOGY CO., LTD., Shenzhen (CN)

(72) Inventor: Xiuqing Wang, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/486,027

(22) PCT Filed: Apr. 24, 2024

(86) PCT No.: PCT/CN2024/089565
§ 371 (c)(1),
(2) Date: Nov. 19, 2025

(87) PCT Pub. No.: WO2025/118462
PCT Pub. Date: Jun. 12, 2025

(65) Prior Publication Data
US 2026/0147523 A1 May 28, 2026

(30) Foreign Application Priority Data
Dec. 5, 2023 (CN) .......................... 202311664930.2

(51) Int. Cl.
*G06F 3/14* (2006.01)
(52) U.S. Cl.
CPC .................................. *G06F 3/1462* (2013.01)
(58) Field of Classification Search
CPC .................................................. G06F 3/1462

(Continued)

(56) References Cited

U.S. PATENT DOCUMENTS

2013/0246969 A1* 9/2013 Barton .................. G06F 3/1462
715/788
2017/0039985 A1* 2/2017 Kuo ........................ G09G 5/363
2023/0061646 A1* 3/2023 D'Amico .................. G06T 3/40

FOREIGN PATENT DOCUMENTS

CN 105448225 3/2016
CN 106302760 A 1/2017
(Continued)

OTHER PUBLICATIONS

The International search report for PCT Application No. PCT/CN2024/089565, dated Jul. 31, 2024, 10 pages.
(Continued)

*Primary Examiner* — Mark Edwards
(74) *Attorney, Agent, or Firm* — East IP P.C.

(57) ABSTRACT

The present application discloses a remote control method, apparatus, device, and medium. The method applicable to a controlled device includes: creating a first screen capture task based on a GDI mode and a second screen capture task based on a DirectX mode; calling, in a target screen capture frequency, the first screen capture task and the second screen capture task to simultaneously perform screen capture; determining whether a first image is same as a second image, where the second image is an image of a previous frame of the first image obtained by calling the second screen capture task to perform screen capture; performing, if the first image is different from the second image, target processing on an image obtained by calling the first screen capture task to perform screen capture; and reducing, if the first image is the same as the second image, the target screen capture frequency.

20 Claims, 4 Drawing Sheets

(58) Field of Classification Search
USPC ......................................................... 345/2.1
See application file for complete search history.

(56)                    References Cited

FOREIGN PATENT DOCUMENTS

| CN | 115202779 A | 10/2022 |
| CN | 117648151 A | 3/2024 |
| JP | 2014032328 A | 2/2014 |

OTHER PUBLICATIONS

Wang Fenggui et al."Status monitoring of instruments based on computer screen recognition", Journal of Jilin University (Engineering and Technology Edition); vol. 39, No. 2, Mar. 2009, 4 pages.
Will. Liu: "Implementation of Screen Sharing in WebRTC", published on Nov. 28, 2020, 5 pages.
The Notice of the Granting for Chinese Application No. 202311664930. 2, dated Jan. 27, 2025, 6 pages.

* cited by examiner

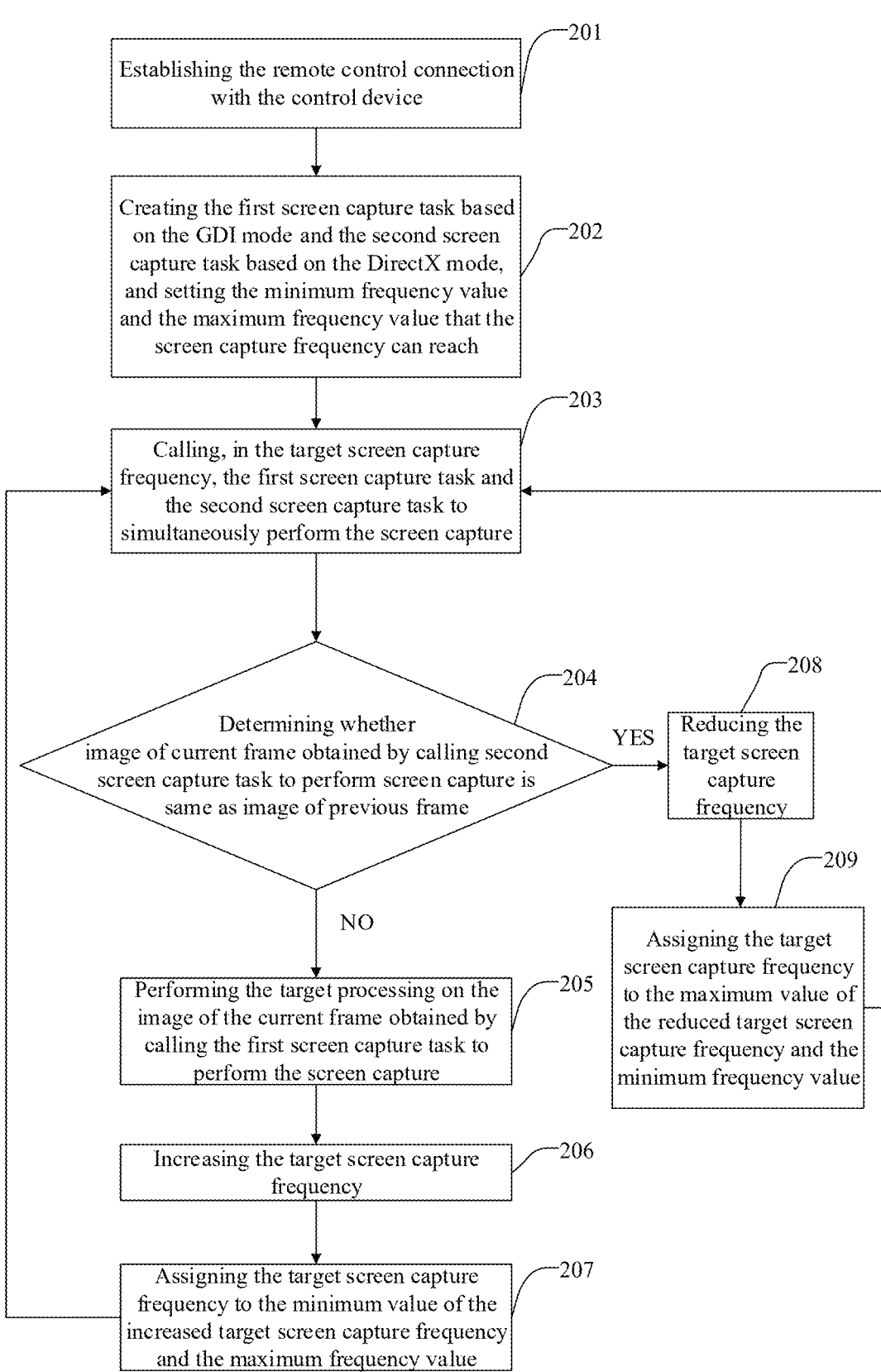

Establishing the remote control connection with the control device — 201

Creating the first screen capture task based on the GDI mode and the second screen capture task based on the DirectX mode, and setting the minimum frequency value and the maximum frequency value that the screen capture frequency can reach — 202

Calling, in the target screen capture frequency, the first screen capture task and the second screen capture task to simultaneously perform the screen capture — 203

Determining whether image of current frame obtained by calling second screen capture task to perform screen capture is same as image of previous frame — 204

YES

Reducing the target screen capture frequency — 208

Assigning the target screen capture frequency to the maximum value of the reduced target screen capture frequency and the minimum frequency value — 209

NO

Performing the target processing on the image of the current frame obtained by calling the first screen capture task to perform the screen capture — 205

Increasing the target screen capture frequency — 206

Assigning the target screen capture frequency to the minimum value of the increased target screen capture frequency and the maximum frequency value — 207

Fig. 2

REMOTE CONTROL METHOD, APPARATUS, DEVICE, AND MEDIUM USING SIMULTANEOUS FIRST AND SECOND SCREEN CAPTURES

CROSS-REFERENCE TO RELATED APPLICATION

The present application is a National Stage of International Application No. PCT/CN2024/089565, filed on Apr. 24, 2024, which claims priority to Chinese Patent Application No. 202311664930.2 filed on Dec. 5, 2023, both of which are incorporated herein by reference in their entireties.

TECHNICAL FIELD

The present application relates to the technical field of remote control, and particularly, to a remote control method, apparatus, device, and medium.

BACKGROUND

Remote control refers to a technology that a control device is communicatively connected to a controlled device, so that the desktop environment of the controlled device is displayed on the control device, and the controlled device is controlled by the control device (for example, configuring, installing software, modifying, and the like).

During the remote control, the controlled device needs to perform screen capture, image conversion, image encoding, data transmission, and the like on the desktop thereof, so that the controlled device can be controlled by the control device.

SUMMARY

In a first aspect, some embodiments of the present application provide a remote control method applicable to a controlled device, and the remote control method includes:

creating, after a remote control connection is established with a first control device, a first screen capture task and a second screen capture task, where the first screen capture task is a screen capture task based on a Graphics Device Interface (GDI) mode, and the second screen capture task is a screen capture task based on a Direct eXtension (DirectX) mode;

calling, in a target screen capture frequency, the first screen capture task and the second screen capture task to simultaneously perform screen capture;

determining whether a first image is same as a second image, where the second image is an image of a previous frame of the first image obtained by calling the second screen capture task to perform the screen capture;

performing, under a condition that the first image is different from the second image, target processing on an image obtained by calling the first screen capture task to perform the screen capture, and continuing the calling, in a target screen capture frequency, the first screen capture task and the second screen capture task to simultaneously perform screen capture, where the target processing includes image conversion, image encoding, and sending of an image processed by the image conversion and the image encoding to a control device; and stopping, under a condition that the first image is the same as the second image, performing the target processing on the image obtained by calling the first screen capture task to perform the screen capture, reducing the target screen capture frequency, using a screen capture frequency obtained by reducing the target screen capture frequency as the target screen capture frequency, and continuing the calling, in a target screen capture frequency, the first screen capture task and the second screen capture task to simultaneously perform screen capture.

In a second aspect, some embodiments of the present application provide a remote control apparatus applicable to a controlled device, and the remote control apparatus includes:

a creation module configured to create, after a remote control connection is established with a first control device, a first screen capture task and a second screen capture task, where the first screen capture task is a screen capture task based on a GDI mode, and the second screen capture task is a screen capture task based on a DirectX mode;

a screen capture module configured to call, in a target screen capture frequency, the first screen capture task and the second screen capture task to simultaneously perform screen capture;

a first determination module configured to determine whether a first image is same as a second image, trigger, under a condition that the first image is different from the second image, a first processing module, and trigger, under a condition that the first image is the same as the second image, a first stop module, where the second image is an image of a previous frame of the first image obtained by calling the second screen capture task to perform the screen capture;

a first processing module configured to perform target processing on an image obtained by calling the first screen capture task to perform the screen capture to trigger the screen capture module, where the target processing includes image conversion, image encoding, and sending of an image after the image conversion and the image encoding to a control device;

a first stop module configured to stop performing the target processing on the image obtained by calling the first screen capture task to perform the screen capture; and a reduction module configured to reduce the target screen capture frequency, use a screen capture frequency obtained by reducing the target screen capture frequency as the target screen capture frequency, and trigger the screen capture module.

In a third aspect, some embodiments of the present application provide an electronic device including a processor and a memory storing computer program instructions; the processor, when executing the computer program instructions, implements the remote control method according to the first aspect of the embodiments of the present application.

In a fourth aspect, some embodiments of the present application provide a computer-readable storage medium storing computer program instructions, and the computer program instructions, when executed by a processor, implement the remote control method according to the first aspect of the embodiments of the present application.

In a fifth aspect, some embodiments of the present application provide a computer program product, when instructions in the computer program product are executed by a processor of an electronic device, the electronic device executes the remote control method according to the first aspect of the embodiments of the present application.

BRIEF DESCRIPTION OF THE DRAWINGS

In order to illustrate technical solutions of embodiments of the present application more clearly, the drawings used in the embodiments of the present application will be briefly described. For a person skilled in the art, other drawings can be obtained from these drawings without any inventive effort.

FIG. 2 is a schematic view of a first process of remote control according to embodiments of the present application;

DETAILED DESCRIPTION

Figure 1:
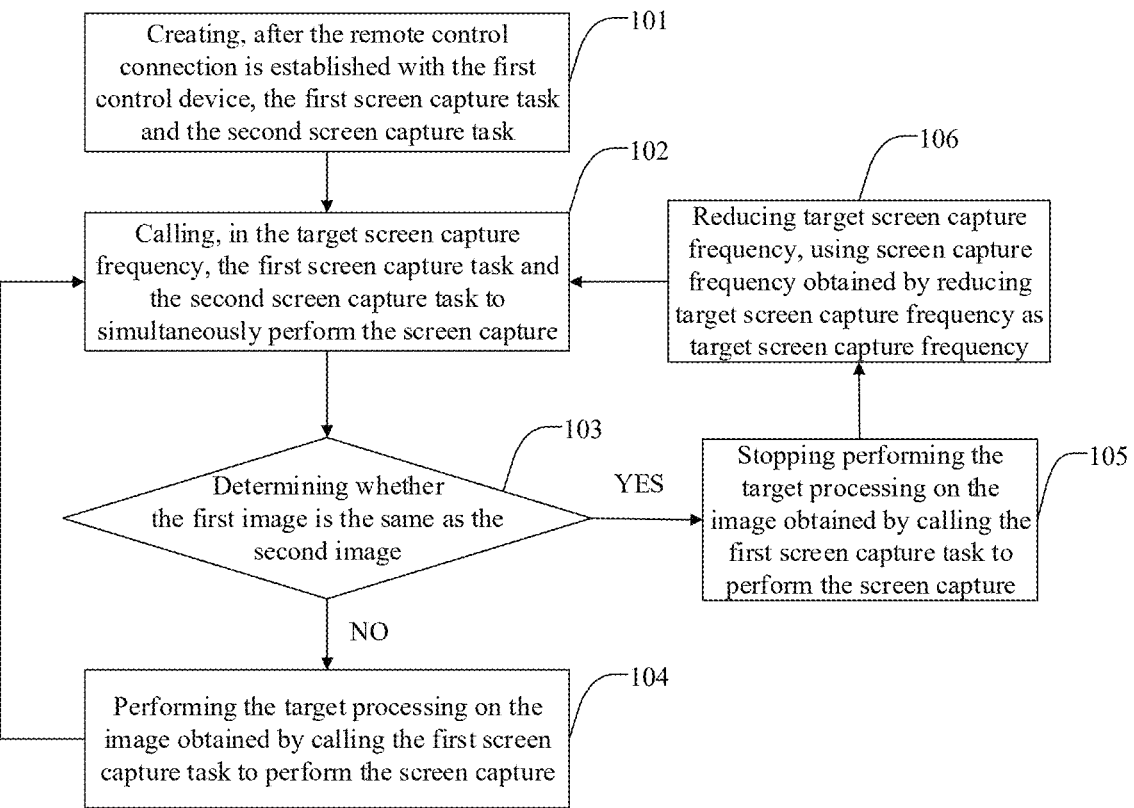
FIG. 1 is a schematic flowchart of a remote control method according to embodiments of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that the specific embodiments described herein are only intended to explain the present application, rather than to limit the present application. For those skilled in the art, the present application may be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

A remote control method, apparatus, device, and medium according to embodiments of the present application will be described in detail below with reference to the drawings using specific embodiments and scenarios thereof.

It should be noted that, the remote control method and the remote control apparatus according to the embodiments of the present application is applicable to a controlled device. The controlled device may be a terminal or other devices other than the terminal. For example, the controlled device may be a mobile phone, a tablet computer, a notebook computer, a palm computer, a vehicle-mounted electronic device, a Mobile Internet Device (MID), an augmented reality (AR)/virtual reality (VR) device, a robot, a wearable device, an ultra-mobile personal computer (UMPC), a net-book, or a personal digital assistant (PDA), or may be a server, a Network Attached Storage (NAS), a personal computer (PC), a television (TV), a teller machine, or a self-service machine, which is not limited in the embodiments of the present application.

The controlled device in the embodiments of the present application may be an electronic device having an operating system. The operating system may be a Microsoft (Windows) operating system, an iOS operating system, or other possible operating systems, which is not limited in the embodiments of the present application.

FIG. 1 is a schematic flowchart of a remote control method according to embodiments of the present application. As shown in FIG. 1, the remote control method may include the following steps.

In step 101, after the remote control connection is established with the first control device, the first screen capture task and the second screen capture task are created.

In some possible embodiments of the present application, in step 101, the first screen capture task is a screen capture task based on the GDI mode, and the second screen capture task is a screen capture task based on the DirectX mode.

In some possible embodiments of the present application, in step 101, a screen capturer task may be created and set to be the GDI mode, and another screen capture task may be created and set to be the DirectX mode.

In step 102, in the target screen capture frequency, the first screen capture task and the second screen capture task are called to simultaneously perform the screen capture.

In some possible embodiments of the present application, in step 102, the same screen capture frequency is used in the first screen capture task and the second screen capture task to simultaneously perform the screen capture.

In step 103, it is determined whether the first image is the same as the second image; under a condition that the first image is not the same as the second image, step 104 is executed, and under a condition that the first image is the same as the second image, step 105 is executed.

In some possible embodiments of the present application, the second image is an image of the previous frame of the first image obtained by calling the second screen capture task to perform the screen capture.

The approach to determining whether the first image is the same as the second image is not limited in the embodiments of the present application, and any available approach may be applied in the embodiments of the present application. For example, whether the first image is the same as the second image is determined by calculating the similarity between the first image and the second image; under a condition that the similarity between the first image and the second image is greater than the preset similarity threshold, it is determined that the first image is the same as the second image, and under a condition that the similarity between the first image and the second image is not greater than the preset similarity threshold, it is determined that the first image is different from the second image.

In some possible embodiments of the present application, step 103 may include: determining, based on the desktop frame, whether the updated region corresponding to the second image is empty; under a condition that the updated region is empty, the second image is the same as the first image; under a condition that the updated region is not empty, the second image is different from the first image, where the desktop frame is obtained based on the callback of the second screen capture task.

Specifically, the desktop frame may be obtained from the callback of the screen capture task based on the DirectX mode, and whether the updated region of the currently captured video frame (referred to as the current video frame below) is empty may be determined by an updated region approach of the desktop frame to determine whether the first image is the same as the second image. Under a condition that the updated region of the current video frame is empty, it means that the current video frame is the same as the previous video frame, that is, the first image is the same as the second image; and under a condition that the updated region of the current video frame is not empty, it means that the current video frame is different from the previous video frame, that is, the first image is different from the second image.

In step 104, the target processing is performed on the image obtained by calling the first screen capture task to perform the screen capture, and step 102 continues to be executed.

In some possible embodiments of the present application, the target processing includes image conversion, image encoding, and sending of the image processed by the image conversion and the image encoding to the control device.

The reference for the process of image conversion, image encoding, and sending of the image processed by the image conversion and the image encoding to the control device may be specifically made to the process of image conversion, image encoding, and sending of the image processed by the image conversion and the image encoding to the control device in the related design, which is not repeated in the embodiments of the present application.

It should be noted that, under a condition that the target processing is performed on the image obtained by calling the first screen capture task to perform the screen capture, the target processing is not performed on the image obtained by calling the second screen capture task to perform the screen capture. That is, in the embodiments of the present application, the image obtained by calling the second screen capture task to perform the screen capture is only used for determining whether the images are the same, and the target processing is not performed on the image obtained by calling the second screen capture task to perform the screen capture.

In step 105, the target processing on the image obtained by calling the first screen capture task to perform the screen capture is stopped.

In step 106, the target screen capture frequency is reduced, the screen capture frequency obtained by reducing the target screen capture frequency is used as the target screen capture frequency, and step 102 continues to be executed.

Exemplarily, device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 25 frames per second.

It is assumed that, it is determined that the images of previous 30 frames obtained in the frequency of 25 frames per second are different from each other based on the image obtained by the second screen capture task, the image conversion and the image encoding are performed on the images of previous 30 frames obtained by calling the first screen capture task to perform the screen capture, and the images processed by the image conversion and the image encoding are sent to device B for display and are used by device B to remotely control device A.

Under a condition that the image of the 31st frame is captured, it is determined that the image of the 31st frame is the same as the image of the 30-th frame based on the image obtained by the second screen capture task, and performing the image conversion and the image encoding on the image of the 31st frame obtained by the first screen capture task stops, that is, the image conversion or the image encoding is not performed on the image of the 31st frame obtained by the first screen capture task, and the image is not sent to device B. In this case, the window image used in device B for controlling device A is kept at the last video frame (that is, the image obtained after the image conversion and the image encoding are performed on the image of the 30-th frame obtained by calling the first screen capture task to perform the screen capture) before the 31st frame, and since the image itself does not change, keeping the window image used in device B for controlling device A at the last video frame does not affect the use. Then, the screen capture frequency is reduced, for example, to 5 frames per second. Then two screen capture tasks are called to simultaneously capture the screen of device A in the frequency of 5 frames per second.

Under a condition that the content of the desktop screen changes, the screen capture method based on the GDI mode consumes fewer resources than the screen capture method based on the DirectX mode. However, since the screen capture method based on the GDI mode does not have the updated region approach of the video frame, the frame conversion, the frame encoding, and the frame transmission are performed even when the content of the desktop screen does not change, while the screen capture method based on the DirectX mode has the updated region approach of the video frame, and under a condition that the content of the desktop screen does not change, the frame conversion, the frame encoding, and the frame transmission are not performed subsequently. In this case, the screen capture method based on the DirectX mode consumes fewer resources than the screen capture method based on the GDI mode. Based on this, in the embodiments of the present application, the screen capture method based on the GDI mode and the screen capture method based on the DirectX mode are combined, whether the content of the desktop screen changes is determined through the updated region approach of the video frame of the screen capture method based on the DirectX mode; under a condition that the content of the desktop screen does not change, the screen capture frequency is reduced, and performing the frame conversion, the frame encoding, and the frame transmission on the video frame obtained by the screen capture method based on the DirectX mode stops, so as to achieve the purpose of consuming fewer resources when the screen image is still or changing.

In the embodiments of the present application, after the controlled device establishes the remote control connection with the first control device, the first screen capture task based on the GDI mode and the second screen capture task based on the DirectX mode are created; the first screen capture task and the second screen capture task are called to simultaneously perform the screen capture in the target screen capture frequency; whether the first image is the same as the second image is determined, where the second image is the image of the previous frame of the first image obtained by calling the second screen capture task to perform the screen capture; under a condition that the first image is different from the second image, the target processing is performed on the image obtained by calling the first screen capture task to perform the screen capture, where the target processing includes the image conversion, the image encoding, and the sending of the image processed by the image conversion and the image encoding to the control device; and under a condition that the first image is the same as the second image, the target screen capture frequency is reduced. In this way, under a condition that the first image is the same as the second image, the resources occupied when the screen capture is performed can be reduced by reducing the screen capture frequency, so that the resources occupied when the remote control is performed can be reduced. Also, since the screen capture frequency is reduced, the number of the captured images is reduced, so that the number of the images on which the target processing is performed is reduced, which can reduce the resources occupied when the remote control is performed.

In some possible embodiments of the present application, after step 106, the remote control method according to the embodiments of the present application may further include: determining whether the target screen capture frequency is greater than or equal to the first screen capture frequency threshold; and continuing step 102 under a condition that the target screen capture frequency is greater than or equal to the first screen capture frequency threshold.

In some possible embodiments of the present application, the first screen capture frequency threshold in the embodiments of the present application may be the minimum frequency value that the screen capture frequency can reach; and the first screen capture frequency threshold in the embodiments of the present application may be set based on actual needs.

Exemplarily, it is assumed that the first screen capture frequency threshold is 5 frames per second; device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 25 frames per second.

It is assumed that, it is determined that the images of previous 30 frames obtained in the frequency of 25 frames per second are different from each other based on the image obtained by the second screen capture task, the image conversion and the image encoding are performed on the images of previous 30 frames obtained by calling the first screen capture task to perform the screen capture, and the images processed by the image conversion and the image encoding are sent to device B for display and are used by device B to remotely control device A.

Under a condition that the image of the 31st frame is captured, it is determined that the image of the 31st frame is the same as the image of the 30-th frame based on the image obtained by the second screen capture task, performing the image conversion and the image encoding on the image of the 31st frame obtained by the first screen capture task stops, and the screen capture frequency is reduced, for example, to 15 frames per second; under this condition, the target screen capture frequency of 15 frames per second is greater than the first screen capture frequency threshold of 5 frames per second, and two screen capture tasks are called to simultaneously capture the screen of device A in the frequency of 15 frames per second.

In the embodiments of the present application, the screen capture continues only when the target screen capture frequency is greater than or equal to the first screen capture frequency threshold, so that the occurrence of inaccurate control caused by not timely providing the feedback to the control device when the screen capture frequency is excessively low, the screen capture interval is excessively long, and the screen changes during the screen capture interval can be prevented.

In some embodiments of the present application, the remote control method according to the embodiments of the present application may further include: assigning, under a condition that the target screen capture frequency is less than the first screen capture frequency threshold, the target screen capture frequency to the first screen capture frequency threshold, and continuing step 102.

Exemplarily, it is assumed that the first screen capture frequency threshold is 5 frames per second; device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 14 frames per second.

It is assumed that, it is determined that the images of previous 30 frames obtained in the frequency of 14 frames per second are different from each other based on the image obtained by the second screen capture task, the image conversion and the image encoding are performed on the images of previous 30 frames obtained by calling the first screen capture task to perform the screen capture, and the images processed by the image conversion and the image encoding are sent to device B for display and are used by device B to remotely control device A.

Under a condition that the image of the 31st frame is captured, it is determined that the image of the 31st frame is the same as the image of the 30-th frame based on the image obtained by the second screen capture task, performing the image conversion and the image encoding on the image of the 31st frame obtained by the first screen capture task stops, and the screen capture frequency is reduced, for example, to 4 frames per second; under this condition, the target screen capture frequency of 4 frames per second is less than the first screen capture frequency threshold of 5 frames per second, then the target screen capture frequency is assigned to be 5 frames per second, and two screen capture tasks are called to simultaneously capture the screen of device A in the frequency of 5 frames per second.

In the embodiments of the present application, under a condition that the target screen capture frequency is not greater than the first screen capture frequency threshold, the target screen capture frequency is assigned to the first screen capture frequency threshold, so that the occurrence of inaccurate control caused by not timely providing the feedback to the control device when the screen capture frequency is excessively low, the screen capture interval is excessively long, and the screen changes during the screen capture interval can be prevented.

In some possible embodiments of the present application, after step 104, the remote control method according to the embodiments of the present application may further include: increasing the target screen capture frequency, using the screen capture frequency obtained by increasing the target screen capture frequency as the target screen capture frequency, and continuing step 102.

Exemplarily, device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 5 frames per second.

It is assumed that, it is determined that the images of the second frame and the first frame obtained in the frequency of 5 frames per second are different from each other based on the image obtained by the second screen capture task, the image conversion and the image encoding are performed on the images obtained by calling the first screen capture task to perform the screen capture, and the images processed by the image conversion and the image encoding are sent to device B for display and are used by device B to remotely control device A. The screen capture frequency is increased, for example, to 15 frames per second. Then two screen capture tasks are called to simultaneously capture the screen of device A in the frequency of 15 frames per second.

It is assumed that, it is determined that the images of the second frame and the first frame obtained in the frequency of 15 frames per second are different from each other based on the image obtained by the second screen capture task, the image conversion and the image encoding are performed on the images obtained by calling the first screen capture task to perform the screen capture, and the images processed by the image conversion and the image encoding are sent to device B for display and are used by device B to remotely control device A. The screen capture frequency is increased, for example, to 25 frames per second. Then two screen capture tasks are called to simultaneously capture the screen of device A in the frequency of 25 frames per second.

In some possible embodiments of the present application, after the screen capture frequency obtained by increasing the target screen capture frequency is used as the target screen capture frequency, the remote control method according to the embodiments of the present application may further include: determining whether the target screen capture frequency is less than or equal to the second screen capture frequency threshold; and continuing step 102 under a condition that the target screen capture frequency is less than or equal to the second screen capture frequency threshold.

In some possible embodiments of the present application, the second screen capture frequency threshold in the embodiments of the present application may be the maximum frequency value that the screen capture frequency can reach; and the second screen capture frequency threshold in the embodiments of the present application may be set based on actual needs.

Exemplarily, the second screen capture frequency threshold is 25 frames per second; device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 10 frames per second.

It is assumed that, it is determined that the images of the second frame and the first frame obtained in the frequency of 10 frames per second are different from each other based on the image obtained by the second screen capture task, the image conversion and the image encoding are performed on the images obtained by calling the first screen capture task to perform the screen capture, and the images processed by the image conversion and the image encoding are sent to device B for display and are used by device B to remotely control device A. The screen capture frequency is increased, for example, to 20 frames per second. Under this condition, the target screen capture frequency of 20 frames per second is less than the second screen capture frequency threshold 25 frames per second, and two screen capture tasks are called to simultaneously capture the screen of device A in the frequency of 20 frames per second.

In the embodiments of the present application, the screen capture continues only when the target screen capture frequency is less than or equal to the second screen capture frequency threshold, so that the occurrence of resource occupation due to excessively great screen capture frequency and frequent screen capture can be prevented.

In some possible embodiments of the present application, the remote control method according to the embodiments of the present application may further include: assigning, under a condition that the target screen capture frequency is greater than the second screen capture frequency threshold, the target screen capture frequency to the second screen capture frequency threshold, and continuing step 102.

Exemplarily, the second screen capture frequency threshold is 25 frames per second; device A establishes the remote control connection with device B, device A is the controlled device, and device B is the control device. The first screen capture task based on the GDI mode and the second screen capture task based on the DirectX mode are created on device A. Then two screen capture tasks are called to simultaneously capture the screen of device A in the frequency of 10 frames per second.

It is assumed that, it is determined that the images of the second frame and the first frame obtained in the frequency of 10 frames per second are different from each other based on the image obtained by the second screen capture task, the image conversion and the image encoding are performed on the images obtained by calling the first screen capture task to perform the screen capture, and the images processed by the image conversion and the image encoding are sent to device B for display and are used by device B to remotely control device A. The screen capture frequency is increased, for example, to 20 frames per second. Under this condition, the target screen capture frequency of 20 frames per second is less than the second screen capture frequency threshold 25 frames per second, and two screen capture tasks are called to simultaneously capture the screen of device A in the frequency of 20 frames per second.

It is assumed that, it is determined that the images of the second frame and the first frame obtained in the frequency of 20 frames per second are different from each other based on the image obtained by the second screen capture task, the image conversion and the image encoding are performed on the images obtained by calling the first screen capture task to perform the screen capture, and the images processed by the image conversion and the image encoding are sent to device B for display and are used by device B to remotely control device A. The screen capture frequency are increased, for example, to 30 frames per second. Under this condition, the target screen capture frequency of 30 frames per second is greater than the second screen capture frequency threshold 25 frames per second, then the target screen capture frequency is assigned to 25 frames per second. Then two screen capture tasks are called to simultaneously capture the screen of device A in the frequency of 25 frames per second.

In the embodiments of the present application, under a condition that the target screen capture frequency is greater than the second screen capture frequency threshold, the target screen capture frequency is assigned to the second screen capture frequency threshold, so that the occurrence of resource occupation due to excessively great screen capture frequency and frequent screen capture can be prevented.

It should be noted that, in the embodiments of the present application, the second screen capture frequency threshold is greater than the first screen capture frequency threshold.

In some possible embodiments of the present application, after the target screen capture frequency is reduced, the target screen capture frequency may be compared with the first screen capture frequency threshold, and under a condition that the target screen capture frequency is less than the first screen capture frequency threshold, the target screen capture frequency may be re-assigned to the first screen capture frequency threshold; after the target screen capture frequency is increased, the target screen capture frequency may be compared with the second screen capture frequency threshold, and under a condition that the target screen capture frequency is greater than the first screen capture frequency threshold, the target screen capture frequency may be re-assigned to the second screen capture frequency threshold.

That is, after the target screen capture frequency is reduced, the value of the target screen capture frequency is the maximum value of the reduced frequency and the first screen capture frequency threshold; after the target screen capture frequency is increased, the value of the target screen capture frequency is the minimum value of the increased frequency and the second screen capture frequency threshold.

In the embodiments of the present application, it can be ensured that the target screen capture frequency does not exceed the value range of the first screen capture frequency threshold and the second screen capture frequency threshold.

In some possible embodiments of the present application, under a condition that the first image is the same as the second image, a new control device establishes the remote control connection with the controlled device. Under this condition, since the controlled device does not transmit an image, the new control device cannot control the controlled device. Based on this, the remote control method according to the embodiments of the present application may further include: performing, under a condition that the first image is the same as the second image, and after the second control device establishes the remote control connection with the controlled device, the target processing on the image obtained by calling the first screen capture task to perform the screen capture.

In the embodiments of the present application, even if the first image is the same as the second image, under a condition that the new control device establishes the remote control connection with the controlled device, the image is sent to the control device, so that the new control device can control the controlled device.

In some possible embodiments of the present application, after the second control device establishes the remote control connection with the controlled device, and before the target processing is performed on the image obtained by calling the first screen capture task to perform the screen capture, the remote control method according to the embodiments of the present application may further include: stopping step 103.

In some possible embodiments of the present application, the step 103 of comparing the frame images may stop for a period of time (for example, 5 seconds), and the first screen capture task and the second screen capture task are normally performed; in this period of time, the control device can receive the image sent by the controlled device, and control the controlled device based on the received image. After the period of time, step 103 continues.

FIG. 2 is a schematic view of a first process of remote control according to embodiments of the present application. The process of the remote control includes the following steps:

step 201: establishing the remote control connection with the control device;

step 202: creating the first screen capture task based on the GDI mode and the second screen capture task based on the DirectX mode, and setting the minimum frequency value and the maximum frequency value that the screen capture frequency can reach;

step 203: calling, in the target screen capture frequency, the first screen capture task and the second screen capture task to simultaneously perform the screen capture;

step 204: determining whether the image of the current frame obtained by calling the second screen capture task to perform the screen capture is the same as the image of the previous frame, executing step 205 under a condition that the image of the current frame obtained by calling the second screen capture task to perform the screen capture is different from the image of the previous frame, and executing step 208 under a condition that the image of the current frame obtained by calling the second screen capture task to perform the screen capture is the same as the image of the previous frame;

step 205: performing the target processing on the image of the current frame obtained by calling the first screen capture task to perform the screen capture;

step 206: increasing the target screen capture frequency;

step 207: assigning the target screen capture frequency to the minimum value of the increased target screen capture frequency and the maximum frequency value, and continuing step 203;

step 208: reducing the target screen capture frequency; and step 209: assigning the target screen capture frequency to the maximum value of the reduced target screen capture frequency and the minimum frequency value, and continuing the step 203.

Figure 3:
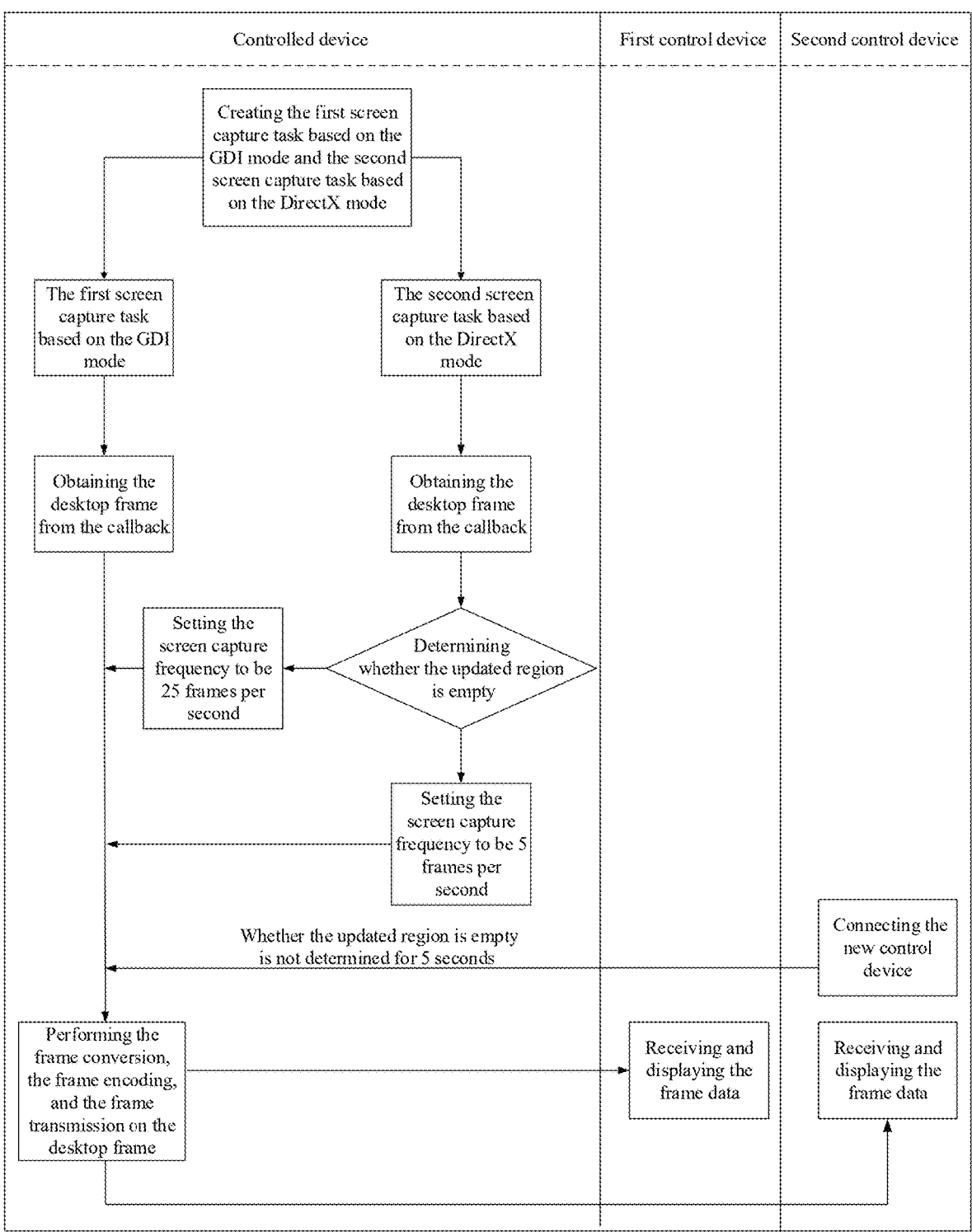
FIG. 3 is a schematic view of a second process of remote control according to embodiments of the present application.

FIG. 3 is a schematic view of a second process of remote control according to embodiments of the present application.

In FIG. 3, the controlled device first creates the first screen capture task based on the GDI mode and the second screen capture task based on the DirectX mode.

For the first screen capture task based on the GDI mode, the desktop frame is obtained from the callback of the first screen capture task based on the GDI mode; and for the second screen capture task based on the DirectX mode, the desktop frame is obtained from the callback of the second screen capture task based on the DirectX mode.

Based on the desktop frame obtained from the callback of the second screen capture task based on the DirectX mode, it is determined whether the updated region is empty; under a condition that the updated region is empty, the screen capture frequency is set to be 5 frames per second, the first screen capture task based on the GDI mode and the second screen capture task based on the DirectX mode each perform the screen capture in the screen capture frequency of 5 frames per second, and then the frame conversion, the frame encoding, and the frame transmission are performed on the desktop frame obtained from the callback of the first screen capture task based on the GDI mode; under a condition that the updated region is not empty, the screen capture frequency is set to be 25 frames per second, the first screen capture task based on the GDI mode and the second screen capture task based on the DirectX mode each perform the screen capture in the screen capture frequency of 25 frames per second, and then the frame conversion, the frame encoding, and the frame transmission are performed on the desktop frame obtained from the callback of the first screen capture task based on the GDI mode.

The first control device receives and displays the frame data sent by the control device.

Under a condition that the new control device is connected (that is, the second control device establishes the remote control connection with the controlled device), it is not determined whether the updated region is empty for 5 seconds; in the 5 seconds, the frame conversion, the frame encoding, and the frame transmission are performed on the desktop frame obtained from the callback of the first screen capture task based on the GDI mode. The first control device and the second control device receive and display the frame data sent by the control device.

Figures 4, 5:
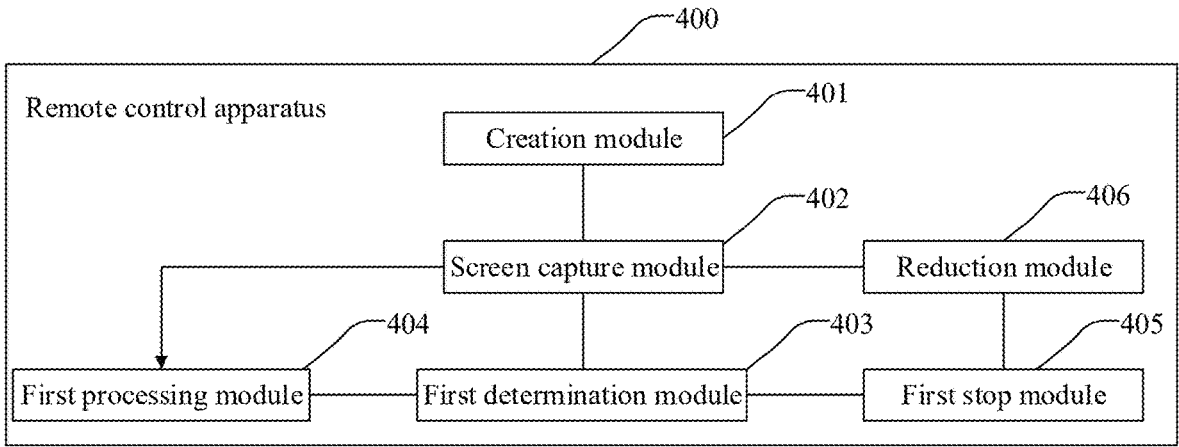
FIG. 4 is a schematic structural view of a remote control apparatus according to embodiments of the present application.
FIG. 5 is a schematic structural view of an electronic device according to embodiments of the present application.

As shown in FIG. 4, embodiments of the present application further provide a remote control apparatus. FIG. 4 is a schematic structural view of a remote control apparatus according to embodiments of the present application, and the remote control apparatus 400 may include the creation module 401, the screen capture module 402, the first determination module 403, the first processing module 404, the first stop module 405, and the reduction module 406.

The creation module 401 is configured to create, after the remote control connection is established with the first control device, the first screen capture task and the second screen capture task, the first screen capture task is a screen capture task based on the GDI mode, and the second screen capture task is a screen capture task based on the DirectX mode.

The screen capture module 402 is configured to call, in the target screen capture frequency, the first screen capture task and the second screen capture task to simultaneously perform the screen capture.

The first determination module 403 is configured to determine whether the first image is the same as the second image, trigger, under a condition that the first image is different from the second image, the first processing module, and trigger, under a condition that the first image is the same as the second image, the first stop module; the second image is an image of the previous frame of the first image obtained by calling the second screen capture task to perform the screen capture.

The first processing module 404 is configured to perform the target processing on the image obtained by calling the first screen capture task to perform the screen capture, and trigger the screen capture module 402; the target processing includes the image conversion, the image encoding, and the sending of the image processed by the image conversion and the image encoding to the control device.

The first stop module 405 is configured to stop performing the target processing on the image obtained by calling the first screen capture task to perform the screen capture.

The reduction module 406 is configured to reduce the target screen capture frequency, use the screen capture frequency obtained by reducing the target screen capture frequency as the target screen capture frequency, and trigger the screen capture module 402.

In the embodiments of the present application, after the controlled device establishes the remote control connection with the first control device, the first screen capture task based on the GDI mode and the second screen capture task based on the DirectX mode are created; the first screen capture task and the second screen capture task are called to simultaneously perform the screen capture in the target screen capture frequency; whether the first image is the same as the second image is determined, where the second image is the image of the previous frame of the first image obtained by calling the second screen capture task to perform the screen capture; under a condition that the first image is different from the second image, the target processing is performed on the image obtained by calling the first screen capture task to perform the screen capture, where the target processing includes the image conversion, the image encoding, and the sending of the image processed by the image conversion and the image encoding to the control device; and under a condition that the first image is the same as the second image, the target screen capture frequency is reduced. In this way, under a condition that the first image is the same as the second image, the resources occupied when the screen capture is performed can be reduced by reducing the screen capture frequency, so that the resources occupied when the remote control is performed can be reduced. Also, since the screen capture frequency is reduced, the number of the captured images is reduced, so that the number of the images on which the target processing is performed is reduced, which can reduce the resources occupied when the remote control is performed.

In some possible embodiments of the present application, the remote control apparatus 400 according to the embodiments of the present application further includes the second determination module.

The second judgment module is configured to determine whether the target screen capture frequency is greater than or equal to the first screen capture frequency threshold, and trigger, under a condition that the target screen capture frequency is greater than or equal to the first screen capture frequency threshold, the screen capture module 402.

In the embodiments of the present application, the screen capture continues only when the target screen capture frequency is greater than or equal to the first screen capture frequency threshold, so that the occurrence of inaccurate control caused by not timely providing the feedback to the control device when the screen capture frequency is excessively low, the screen capture interval is excessively long, and the screen changes during the screen capture interval can be prevented.

In some possible embodiments of the present application, the remote control apparatus 400 according to the embodiments of the present application further includes the first assignment module.

The first assignment module is configured to assign, under a condition that the target screen capture frequency is less than the first screen capture frequency threshold, the target screen capture frequency to the first screen capture frequency threshold, and trigger the screen capture module 402.

In the embodiments of the present application, under a condition that the target screen capture frequency is less than the first screen capture frequency threshold, the target screen capture frequency is assigned to the first screen capture frequency threshold, so that the occurrence of inaccurate control caused by not timely providing the feedback to the control device when the screen capture frequency is excessively low, the screen capture interval is excessively long, and the screen changes during the screen capture interval can be prevented.

In some possible embodiments of the present application, the remote control apparatus 400 according to the embodiments of the present application further includes the increase module.

The increase module is configured to increase the target screen capture frequency, use the screen capture frequency obtained by increasing the target screen capture frequency as the target screen capture frequency, and trigger the screen capture module 402.

In some possible embodiments of the present application, the remote control apparatus 400 according to the embodiments of the present application further includes the third determination module.

The third judging module is configured to determine whether the target screen capture frequency is less than or equal to the second screen capture frequency threshold, and trigger, under a condition that the target screen capture frequency is less than or equal to the second screen capture frequency threshold, the screen capture module 402.

In the embodiments of the present application, the screen capture continues only when the target screen capture frequency is less than or equal to the second screen capture frequency threshold, so that the occurrence of resource occupation due to excessively great screen capture frequency and frequent screen capture can be prevented.

In some possible embodiments of the present application, the remote control apparatus 400 according to the embodiments of the present application further includes the second assignment module.

The second assignment module is configured to assign, under a condition that the target screen capture frequency is greater than the second screen capture frequency threshold, the target screen capture frequency to the second screen capture frequency threshold, and trigger the screen capture module 402.

In the embodiments of the present application, under a condition that the target screen capture frequency is greater than the second screen capture frequency threshold, the target screen capture frequency is assigned to the second screen capture frequency threshold, so that the occurrence of resource occupation due to excessively great screen capture frequency and frequent screen capture can be prevented.

In the embodiments of the present application, it can be ensured that the target screen capture frequency does not exceed the value range of the first screen capture frequency threshold and the second screen capture frequency threshold.

In some possible embodiments of the present application, the remote control apparatus 400 according to the embodiments of the present application further includes the second processing module.

The second processing module is configured to perform, under a condition that the first image is the same as the second image, and after the second control device establishes the remote control connection with the controlled device, the target processing on the image obtained by calling the first screen capture task to perform the screen capture.

In some possible embodiments of the present application, the remote control apparatus 400 according to the embodiments of the present application further includes the second stop module.

The second stop module is configured to stop, after the second control device establishes the remote control connection with the controlled device, determining whether the first image is the same as the second image.

In some possible embodiments of the present application, the first determination module 403 is specifically configured to: determine, based on the desktop frame, whether the updated region corresponding to the second image is empty; under a condition that the updated region is empty, the second image is the same as the first image, and under a condition that the updated region is not empty, the second image is different from the first image; the desktop frame is obtained based on the callback of the second screen capture task.

FIG. 5 is a schematic structural view of an electronic device according to embodiments of the present application.

The electronic device may include the processor 501 and the memory 502 storing computer program instructions.

Specifically, the processor 501 may include a Central Processing Unit (CPU), or an Application Specific Integrated Circuit (ASIC), or one or more integrated circuit(s) configured to implement the embodiments of the present application.

The memory 502 may include the mass storage for data or instructions. By way of example and not limitation, the memory 502 may include a Hard Disk Drive (HDD), a floppy disk drive, a flash memory, an optical disk, a magneto-optical disk, a magnetic tape, or a Universal Serial Bus (USB) drive or a combination of two or more thereof. When appropriate, the memory 502 may include a removable or non-removable (or fixed) medium. When appropriate, the memory 502 may be internal or external to the electronic device. In some particular embodiments, the memory 502 is a non-volatile solid state memory.

In some particular embodiments, the memory may include a Read-Only Memory (ROM), a Random Access Memory (RAM), a magnetic disk storage media device, an optical storage media device, a flash memory device, an electrical, optical or other physical/tangible memory storage device. Thus, the memory generally includes one or more tangible (non-transitory) computer-readable storage media (for example, memory devices) encoded with software which includes computer-executable instructions, and the software, when executed (for example, by one or more processors), is operable to execute the operations described with reference to the remote control method according to the present application.

The processor 501 reads and executes the computer program instructions stored in the memory 502 to implement the remote control method according to the embodiments of the present application.

In an example, the electronic device may further include the communication interface 503 and the bus 510. As shown in FIG. 5, the processor 501, the memory 502, and the communication interface 503 are connected by the bus 510 to communicate with each other.

The communication interface 503 is mainly configured to achieve communication between the modules, apparatuses, units, and/or devices in the embodiments of the present disclosure.

The bus 510 includes hardware, software, or both of them, to couple components of the electronic device to each other. By way of example and not limitation, the bus may include an Accelerated Graphics Port (AGP) or other graphics bus, an Enhanced Industry Standard Architecture (EISA) bus, a Front Side Bus (FSB), a Hyper Transport (HT) interconnect, an Industry Standard Architecture (ISA) bus, an Infiniband interconnect, a Low Pin Count (LPC) bus, a memory bus, an Micro channel architecture (MCA) bus, a Peripheral Component Interconnect (PCI) bus, a PCI-Express (PCI-X) bus, a Serial Advanced Technology Attachment (SATA) bus, a Video electronics standards association local bus (VLB), or any other suitable bus or a combination of two or more thereof. When appropriate, the bus 510 may include one or more buses. Although the particular buses are described and illustrated in the embodiments of the present application, any suitable bus or interconnect is contemplated in the present application.

The electronic device may execute the remote control method according to the embodiments of the present application to achieve the technical effects corresponding to the remote control method according to the embodiments of the present application.

In addition, embodiments of the present application further provide a computer-readable storage medium to implement in conjunction with the remote control method in the above embodiments. The computer-readable storage medium stores computer program instructions; the computer program instructions, when executed by a processor, implement the remote control method according to the embodiments of the present application. Examples of the computer-readable storage media include a non-transitory computer-readable medium such as a ROM, a RAM, a magnetic or optical disk.

The embodiments of the present application provide a computer program product, when instructions in the computer program product are executed by a processor of an electronic device, the electronic device executes the remote control method according to the embodiments of the present application and can achieve the same technical effects, which is not described here in order to avoid repetition.

It should be noted that the present application is not limited to the particular configurations and processes described above and illustrated in the drawings. For the sake of brevity, the detailed description of the known methods is omitted here. In the above embodiments, several specific steps are described and shown as examples. However, the process of the method of the present application is not limited to the specific steps described and illustrated herein, and those skilled in the art may make various changes, modifications, and additions or change the order between the steps after understanding the gist of the present application.

The functional modules shown in the structural block diagrams may be implemented as hardware, software, firmware, or a combination thereof. When implemented as hardware, it may be, for example, an electronic circuit, an application specific integrated circuit (ASIC), appropriate firmware, a plug-in, a function card, and the like. When implemented as software, the elements of the present application are programs or code segments which are used for executing a desired task. The programs or code segments may be stored in a machine-readable medium or transmitted by a data signal carried in a carrier wave over a transmission medium or communication link. The "machine-readable medium" may include any medium capable of storing or transmitting information. Examples of the machine-readable medium include an electronic circuit, a semiconductor memory device, a ROM, a flash memory, an Erasable Read Only Memory (EROM), a floppy disk, a Compact Disc Read-Only Memory (CD-ROM), an optical disk, a hard disk, a fiber optic medium, a Radio Frequency (RF) link, and the like. The code segments may be downloaded via a computer network such as the Internet, intranet, and the like.

It should also be noted that, in the exemplary embodiments mentioned in the present application, some methods or systems are described based on a series of steps or apparatuses. However, the order of the above steps is not limited in the present application, that is, the steps may be executed in the order mentioned in the embodiments, or may be performed in the order different from that in the embodiments, or several steps may be executed at the same time.

The aspects of the present application are described above with reference to the flowcharts and/or block diagrams of the methods, apparatuses (systems), and computer program products according to the embodiments of the present application. It should be understood that each block in the flowcharts and/or block diagrams, and combinations of blocks in the flowcharts and/or block diagrams, may be implemented by the computer program instructions. These computer program instructions may be provided to a processor of a general purpose computer, a special purpose computer or other programmable data processing apparatus to produce a machine, so that these instructions which are executed by the processor of the computer or other programmable data processing apparatus enable the implementation of the functions/actions specified in one or more blocks of the flowcharts and/or block diagrams. Such a processor may be, but is not limited to, a general purpose processor, a special purpose processor, an application specific processor, or a field programmable logic circuit. It may also be understood that each block in the block diagrams and/or flowcharts and the combinations of blocks in the block diagrams and/or flowcharts may also be implemented by special purpose hardware that executes the specified functions or actions or may be implemented by the combinations of the special purpose hardware and the computer instructions.

The above are only specific embodiments of the present application, those skilled in the art may clearly understand that the specific operating processes of the above systems, modules and units may be referred to the corresponding processes in the embodiments of the foregoing method, which is not repeated here for the convenience and brevity of the description. It should be understood that the protection scope of the present application is not limited to this, and any person skilled in the art can easily think of various equivalent modifications or replacements within the technical scope disclosed in the present application, and these modifications or replacements should all be covered within the scope of protection of the present application.

What is claimed is:

1. A remote control method applicable to a controlled device comprising:

creating, after a remote control connection is established with a first control device, a first screen capture task and a second screen capture task, where the first screen capture task is a screen capture task based on a graphics device interface (GDI) mode, and the second screen capture task is a screen capture task based on a direct extension (DirectX) mode;

calling, in a target screen capture frequency, the first screen capture task and the second screen capture task to simultaneously perform screen capture;

determining whether a first image is same as a second image, where the second image is an image of a previous frame of the first image obtained by calling the second screen capture task to perform the screen capture;

performing, under a condition that the first image is different from the second image, target processing on an image obtained by calling the first screen capture task to perform the screen capture, and continuing the calling, in a target screen capture frequency, the first screen capture task and the second screen capture task to simultaneously perform screen capture, where the target processing comprises image conversion, image encoding, and sending of an image processed by the image conversion and the image encoding to a control device; and stopping, under a condition that the first image is the same as the second image, performing the target processing on the image obtained by calling the first screen capture task to perform the screen capture, reducing the target screen capture frequency, using a screen capture frequency obtained by reducing the target screen capture frequency as the target screen capture frequency, and continuing the calling, in a target screen capture frequency, the first screen capture task and the second screen capture task to simultaneously perform screen capture.

2. The remote control method according to claim 1, after the using a screen capture frequency obtained by reducing the target screen capture frequency as the target screen capture frequency, the remote control method further comprising:

determining whether the target screen capture frequency is greater than or equal to a first screen capture frequency threshold; and continuing, under a condition that the target screen capture frequency is greater than or equal to the first screen capture frequency threshold, the calling, in a target screen capture frequency, the first screen capture task and the second screen capture task to simultaneously perform screen capture.

3. The remote control method according to claim 2, further comprising:

assigning, under a condition that the target screen capture frequency is less than the first screen capture frequency threshold, the target screen capture frequency to the first screen capture frequency threshold, and continuing the calling, in a target screen capture frequency, the first screen capture task and the second screen capture task to simultaneously perform screen capture.

4. The remote control method according to claim 1, after the performing target processing on an image obtained by calling the first screen capture task to perform the screen capture, the remote control method further comprising:

increasing the target screen capture frequency, using a screen capture frequency obtained by increasing the target screen capture frequency as the target screen capture frequency, and continuing the calling, in a target screen capture frequency, the first screen capture task and the second screen capture task to simultaneously perform screen capture.

5. The remote control method according to claim 4, after the using a screen capture frequency obtained by increasing the target screen capture frequency as the target screen capture frequency, further comprising:

determining whether the target screen capture frequency is less than or equal to a second screen capture frequency threshold; and continuing, under a condition that the target screen capture frequency is less than or equal to the second screen capture frequency threshold, the calling, in a target screen capture frequency, the first screen capture task and the second screen capture task to simultaneously perform screen capture.

6. The remote control method according to claim 5, further comprising:

assigning, under a condition that the target screen capture frequency is greater than the second screen capture frequency threshold, the target screen capture frequency to the second screen capture frequency threshold, and continuing the calling, in a target screen capture frequency, the first screen capture task and the second screen capture task to simultaneously perform screen capture.

7. The remote control method according to claim 1, further comprising:

performing, under a condition that the first image is the same as the second image, and after a second control device establishes a remote control connection with the controlled device, the target processing on the image obtained by calling the first screen capture task to perform the screen capture.

8. The remote control method according to claim 7, before the performing the target processing on the image obtained by calling the first screen capture task to perform the screen capture, further comprising:

stopping the determining whether a first image is same as a second image.

9. The remote control method according to claim 1, wherein the determining whether a first image is same as a second image comprising:

determining, based on a desktop frame, whether an updated region corresponding to the second image is empty;

under a condition that the updated region is empty, the second image being the same as the first image;

under a condition that the updated region is not empty, the second image being different from the first image, where the desktop frame is obtained based on a callback of the second screen capture task.

10. A remote control apparatus applicable to a controlled device comprising:

a creation module configured to create, after a remote control connection is established with a first control device, a first screen capture task and a second screen capture task, where the first screen capture task is a screen capture task based on a graphics device interface (GDI) mode, and the second screen capture task is a screen capture task based on a direct extension (DirectX) mode;

a screen capture module configured to call, in a target screen capture frequency, the first screen capture task and the second screen capture task to simultaneously perform screen capture;

a first determination module configured to determine whether a first image is same as a second image, trigger, under a condition that the first image is different from the second image, a first processing module, and trigger, under a condition that the first image is the same as the second image, a first stop module, where the second image is an image of a previous frame of the first image obtained by calling the second screen capture task to perform the screen capture;

a first processing module configured to perform target processing on an image obtained by calling the first screen capture task to perform the screen capture, and trigger the screen capture module, where the target processing comprises image conversion, image encoding, and sending of an image processed by the image conversion and the image encoding to a control device;

a first stop module configured to stop performing the target processing on the image obtained by calling the first screen capture task to perform the screen capture; and a reduction module configured to reduce the target screen capture frequency, use a screen capture frequency obtained by reducing the target screen capture frequency as the target screen capture frequency, and trigger the screen capture module.

11. The remote control apparatus according to claim 10, further comprising:

a second determination module configured to determine whether the target screen capture frequency is greater than or equal to a first screen capture frequency threshold, and trigger, under a condition that the target screen capture frequency is greater than or equal to the first screen capture frequency threshold, the screen capture module.

12. The remote control apparatus according to claim 11, further comprising:

a first assignment module configured to assign, under a condition that the target screen capture frequency is less than the first screen capture frequency threshold, the target screen capture frequency to the first screen capture frequency threshold, and trigger the screen capture module.

13. The remote control apparatus according to claim 10, further comprising:

an increase module configured to increase the target screen capture frequency, use a screen capture frequency obtained by increasing the target screen capture frequency as the target screen capture frequency, and trigger the screen capture module.

14. The remote control apparatus according to claim 13, further comprising:

a third determination module configured to determine whether the target screen capture frequency is less than or equal to a second screen capture frequency threshold, and trigger, under a condition that the target screen capture frequency is less than or equal to the second screen capture frequency threshold, the screen capture module.

15. The remote control apparatus according to claim 14, further comprising:

a second assignment module configured to assign, under a condition that the target screen capture frequency is greater than the second screen capture frequency threshold, the target screen capture frequency to the second screen capture frequency threshold, and trigger the screen capture module.

16. The remote control apparatus according to claim 10, further comprising:

a second processing module configured to perform, under a condition that the first image is the same as the second image, and after a second control device establishes a remote control connection with the controlled device, the target processing on the image obtained by calling the first screen capture task to perform the screen capture.

17. The remote control apparatus according to claim 16, further comprising:

a second stop module configured to stop the determining whether a first image is same as a second image.

18. The remote control apparatus according to claim 10, wherein the first determination module is specifically configured to:

determine, based on a desktop frame, whether an updated region corresponding to the second image is empty; under a condition that the updated region is empty, the second image being the same as the first image, and under a condition that the updated region is not empty, the second image being different from the first image; where the desktop frame is obtained based on a call-back of the second screen capture task.

19. An electronic device comprising a processor and a memory storing computer program instructions; where the processor reads and executes the computer program instructions to implement the remote control method according to claim 1.

20. A non-transitory computer-readable storage medium storing thereon computer program instructions that, when executed by a processor, implement the remote control method according to claim 1.

* * * * *